W. S. HADAWAY, Jr.
THERMOSTAT.
APPLICATION FILED MAY 1, 1909.
1,052,816.
Patented Feb. 11, 1913.
2 SHEETS—SHEET 1.
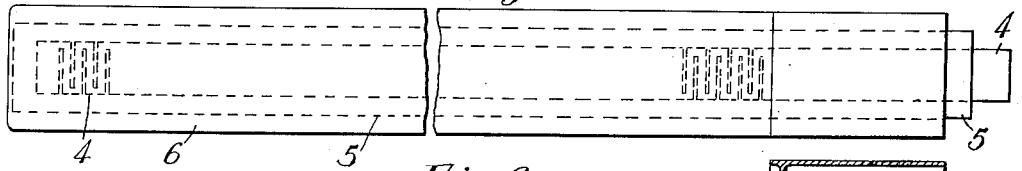
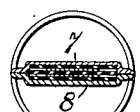
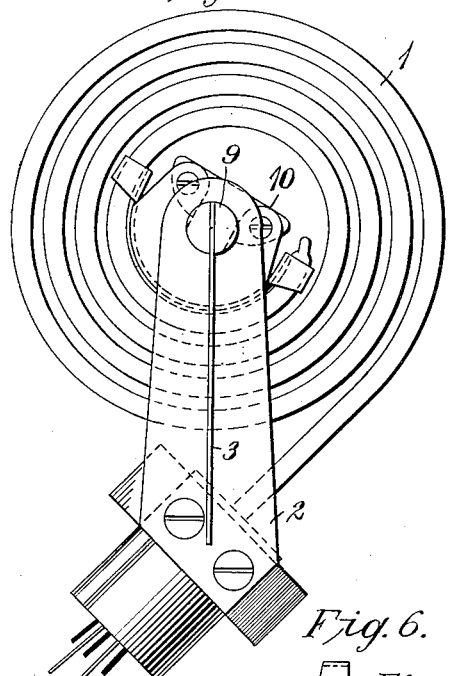
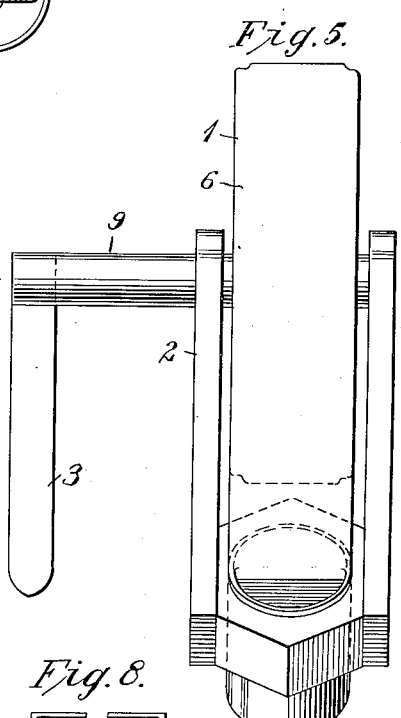
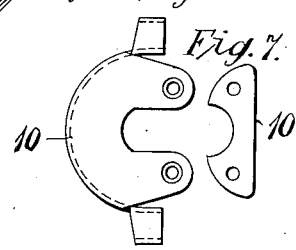
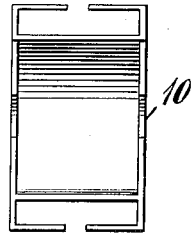
WITNESSES:
Fred H. Miller
INVENTOR
William S. Hadaway, Jr.
BY
ATTORNEY W. S. HADAWAY, Jr.
THERMOSTAT.
APPLICATION FILED MAY 1, 1909.

1,052,816.

Patented Feb. 11, 1913.
2 SHEETS—SHEET 2.

WITNESSES:
Fred H Miller

INVENTOR
William S. Hadaway Jr.
BY
ATTORNEY

# UNITED STATES PATENT OFFICE.

WILLIAM S. HADAWAY, JR., OF EAST ORANGE, NEW JERSEY, ASSIGNOR TO WESTINGHOUSE ELECTRIC AND MANUFACTURING COMPANY, A CORPORATION OF PENNSYLVANIA.

THERMOSTAT.

1,052,816.  Specification of Letters Patent.  Patented Feb. 11, 1913.

Application filed May 1, 1909. Serial No. 493,404.

*To all whom it may concern:*

Be it known that I, WILLIAM S. HADAWAY, Jr., a citizen of the United States, and a resident of East Orange, in the county of Essex and State of New Jersey, have invented a new and useful Improvement in Thermostats, of which the following is a specification.

My invention relates to thermostats or to devices which are adapted to automatically produce a mechanical movement when subjected to temperature variations.

One object of my invention is to provide a simple and durable device of the class above indicated which shall not only produce a predetermined mechanical movement the character and extent of which are dependent upon the temperature existing in the device, but also a device which shall be capable of generating heat for various purposes.

Another object of my invention is to provide an automatic regulator for electric heating devices whereby either a constant temperature or a temperature varying in a predetermined manner, irrespective of the variations in the rate of radiation, may be obtained.

Thermostats, in general, are delicate and unreliable by reason of the fact that, under ordinary conditions, they must be sensitive to variations about relatively low mean temperature values. I have completely overcome this difficulty by making the thermostat itself a heat generator, so that it is subject to relatively high temperatures and may, consequently, be of a very rugged construction. The heating element is similar to that shown in another application filed by me of even date herewith, bearing Serial No. 493,405, and comprising a resistance member to which electric current is applied, an envelop of insulating material and an outer sheath of metal.

When the heating element forms a part of the thermostat, the outer sheath is constructed by welding the edges of two strips of unlike metals, such as brass and iron, together, after the insulated resistance is assembled between them.

My invention is illustrated in the accompanying drawings, in which—

Figure 9:
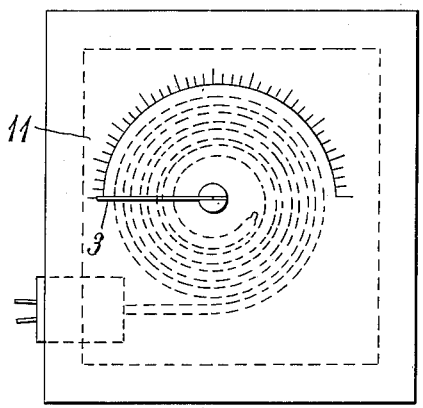
Figure 10:
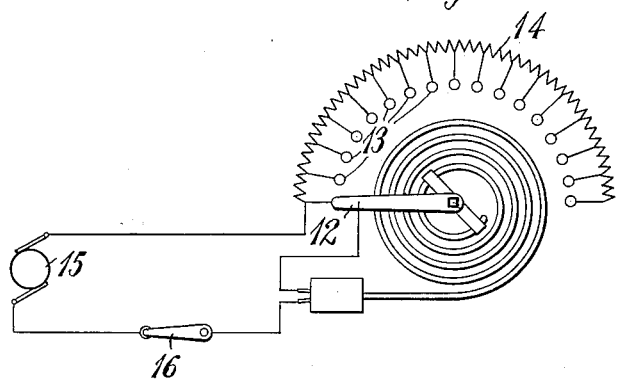

Figure 1 is a plan view, Fig. 2 a longitudinal section and Fig. 3 a transverse section of a heater element which may form a part of my improved heat-generating thermostat. Fig. 4 is a front elevation, Fig. 5 an end elevation, Figs. 6, 7 and 8 detail views of a thermostat embodying my invention, Fig. 9 is a diagrammatic view of the thermostat shown in the other figures and adapted for use as a temperature indicator or a thermometer, and Fig. 10 is a diagram of an automatic regulator by which a constant temperature, or predetermined temperature variations, may be secured.

Referring first to Figs. 1 to 8, inclusive, the device here illustrated comprises an electric heater 1 which is bent in the form of a spiral (see Fig. 4), a supporting frame 2, an indicator 3 and means for operatively connecting the indicator to the inner end of the spiral.

The electric heater comprises a suitable resistance element 4, preferably consisting of a ribbon which may or may not be slotted to provide a zig-zag path for the current; an insulating envelop 5 and an outer sheath 6 which surrounds the insulation and protects the resistance element from injury. The sheath 6 is built up of two metal strips 7 and 8 of unlike material, such as brass and iron, welded together at their edges. A sheath of any other form may be employed, but a very satisfactory structure may be obtained by securing the strips at their edges by the oxy-acetylene welding process.

When the electric heater is completed, as shown in Figs. 1 and 2, it is bent into the form of a spiral, being rigidly supported at one end by the frame 2. The outer end of the spiral may more conveniently be supported in this way, in which case, the inner end is secured to a rotatable shaft 9 by means of a clamping frame 10, illustrated in Figs. 6, 7 and 8, said shaft being supported by the frame 2, and carrying the indicator 3 at one end. Both terminals of the resistance element are brought out of the same end of the electric heater, preferably the outer end, and, after the device is so assembled, electric energy is supplied to the resistance element. The deflection of the inner end of the spiral will cause the shaft 9 to turn to a greater or less degree, according to degree of heat generated, and the rate of radiation from the metal sheath.

As shown in Fig. 9, the indicator 3 may be so associated with a dial plate 11 as to indicate the temperature of the heat generated, or any other variable quantity which is proportional thereto.

Referring to Fig. 10, the thermostat here shown is provided with a contact arm 12, in lieu of the indicator 3 of the other figures, that is adapted to successively engage a plurality of stationary contact members 13 which are connected to the ends of, and to intermediate points in, an external resistance 14. The external resistance 14 is connected in series with the resistance element which forms a part of the thermostat and is supplied with energy from any suitable source, such as generator 15. The arrangement of parts is such that, as control switch 16 is closed and heat is generated in the thermostat, the resulting movement of the rheostat arm 12 will increase the resistance in series with the thermostat and thereby tend to automatically regulate the heat generated. An external resistance becomes unnecessary if the resistance element of the heater is provided with several taps so that the heat generated may be varied according to well known methods by excluding a portion of the resistance element from the circuit, or by connecting its parts in multiple or series multiple circuit combinations.

It will be readily understood by those skilled in the art that, by proper adjustment, the thermostat can be arranged either to automatically maintain any desired temperature in an oven or other chamber to which heat is to be imparted or to automatically obtain any desired heat regulation. For example, a slight adjustment of the rheostat may result when electric energy is first applied to the thermostat and when the radiation is great, and a material adjustment may be effected in the same length of time as the surrounding medium is raised to the temperature of the thermostat. If an external resistance is employed, it may, of course, be located close to, or at some distance from, the thermostat, and the regulation will be adjusted, to some extent, according as the external resistance is, or is not, affected by the heat generated by the thermostat.

I claim as my invention:

1. A combined heat-generating element, a thermostatic sheath therefor and a regulator member carried by said sheath.

2. A combined heat-generating element and a thermostatic sheath therefor.

3. A thermostatic regulator comprising an electric heater element and a thermostatic sheath therefor bent into the form of a spiral and means for rigidly supporting one end of said spiral.

4. A thermostat comprising a heater unit having a resistance element, an insulating envelop and a metal sheath for said resistance element, and means for multiplying the mechanical movement produced when heat is generated in the resistance.

5. A thermostat comprising an electric heating unit in the form of a spiral having a resistance element, an envelop therefor of insulating material, and a sheath for said envelop composed of two strips of unlike metals secured together at their edges, means for rigidly securing one end of the spiral and means for multiplying the mechanical movement, produced by the heating of the resistance element, at the free end of the spiral.

6. The combination with a dial and an arm associated therewith, of a heat-generating element and a thermostatic sheath therefor so associated with said arm that the movement of the arm is dependent upon the heat produced by the heat-generating element.

7. The combination with a stationary dial and an arm associated therewith, of an electric heater element having a thermostatic sheath of spiral form and means for operatively connecting one end of the spiral to said arm, the opposite end of the spiral being held stationary.

8. The combination with a dial, and an arm associated therewith, of a thermostat comprising a spiral electric heater having a resistance element and an envelop therefor, and a sheath for said envelop composed of strips of unlike metals secured together at their edges, and means for operatively connecting the thermostat to said arm.

9. The combination with a dial, and an arm associated therewith, of a thermostat comprising a spiral electric heater having a resistance element, an envelop therefor and a sheath for said envelop composed of strips of unlike metals secured together at their edges and means for operatively connecting the inner end of the spiral to said arm, the outer end of the spiral being held stationary.

10. The combination with a resister, of a heater element and a thermostatic sheath therefor having means for regulating the active length of the resister in accordance with the heat generated in and radiated from the heater element.

11. The combination with a source of electric energy, a thermostat comprising an electric heater and a movable contact arm, of means for adjusting the energy supplied to the heater according to the adjustment of the contact arm.

12. The combination with an external resistance, a plurality of contact members connected to intermediate points therein, a regulating arm adapted to engage the contact members, of a thermostat comprising an electric heater, and means for operatively connecting the thermostat and the regulating arm, said external resistance being adapted to adjust the amount of energy supplied to the heater.

In testimony whereof, I have hereunto subscribed my name this 20th day of April, 1909.

WILLIAM S. HADAWAY, Jr.

Witnesses:
R. J. DEARBORN,
B. B. HINES.